Dec. 26, 1967  R. D. BAGGULEY  3,360,302
COMBINATION PNEUMATIC AND GRAVITY DISCHARGE HOPPER ARRANGEMENT
Filed April 25, 1966  4 Sheets-Sheet 2

INVENTOR
ROBERT D. BAGGULEY
BY Fred P. Kostka
ATT'Y.

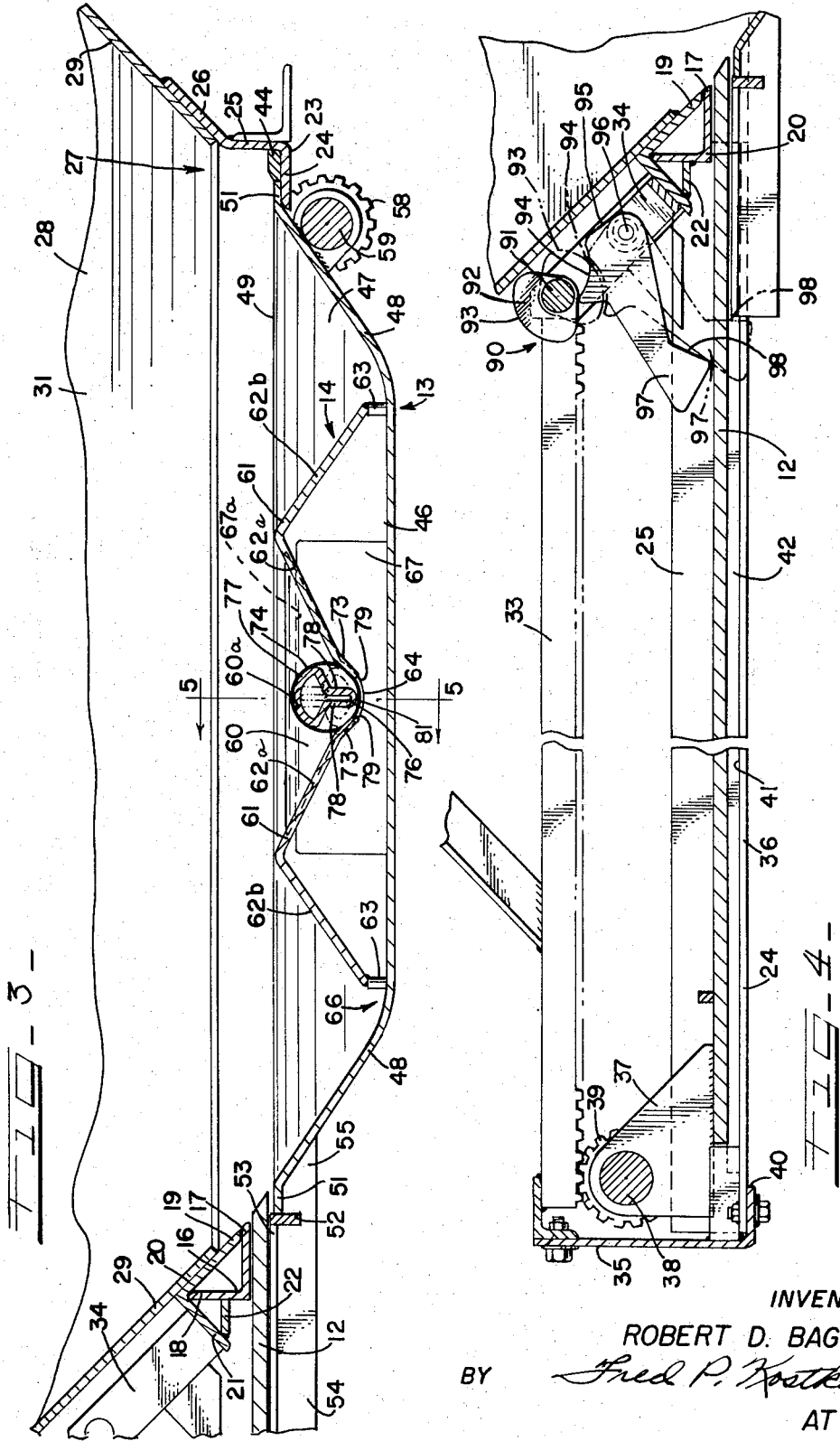

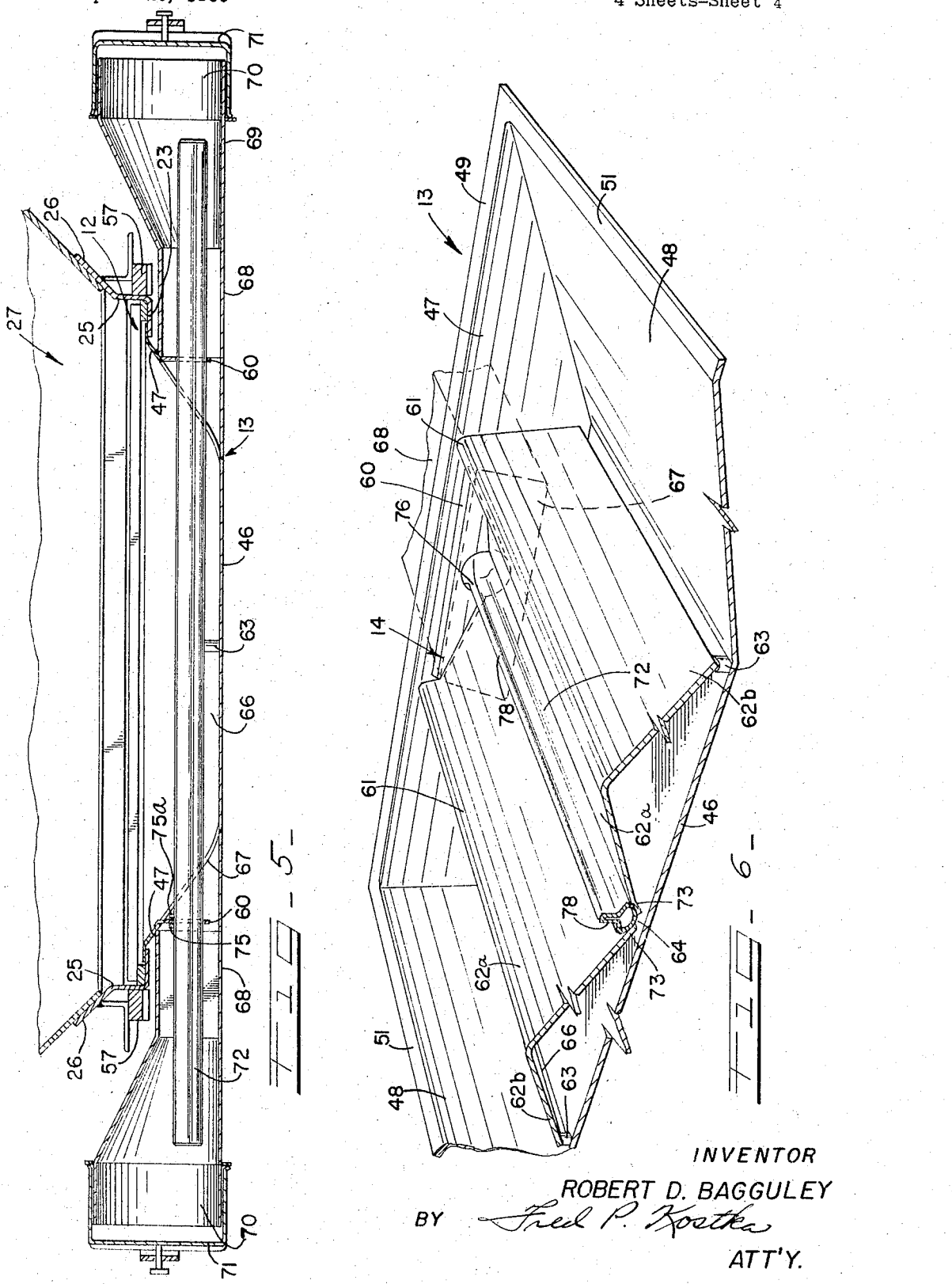

United States Patent Office 3,360,302
Patented Dec. 26, 1967

3,360,302
COMBINATION PNEUMATIC AND GRAVITY
DISCHARGE HOPPER ARRANGEMENT
Robert D. Bagguley, Calumet City, Ill., assignor to Pullman Incorporated, Chicago, Ill., a corporation of Delaware
Filed Apr. 25, 1966, Ser. No. 545,091
10 Claims. (Cl. 302—52)

ABSTRACT OF THE DISCLOSURE

The invention is directed to a combination outlet gate device for controlling a hopper discharge opening including an attachment frame with a support frame extending from one side and having a gate slidable from a position on the attachment frame to a position carried on the support frame. A movable pan mounted on the attachment frame below the gate slides from a position under the hopper to an open position carried by the support frame. Separate rack means are provided on the attachment frame and on the support frame. Gear means located similarly in relation to one edge respectively of the gate and pan cooperate with the respective racks to actuate the gate and pan between open and closed positions. The rack means are disposed in vertically spaced relation and displaced lengthwise in relation to each other.

---

The present invention relates to the unloading of hopper type vehicles and more particularly to a new and novel arrangement for unloading granular or pulverulent materials by way of gravity or a pneumatic conveying system.

It is a principal object of the present invention to provide the gravity openings at the lower end of a hopper with a new and improved discharge arrangement having a gravity gate and a sanitary pan which incorporates a pneumatic discharge structure therein and which is selectably movable clear of said hopper opening to provide a clear unobstructed opening for gravity discharge.

It is another object to the present invention to provide a combination pneumatic and gravity discharge arrangement of the foregoing structure wherein the pneumatic discharge structure is constructed and arranged to provide means for selectively increasing the material inlet area thereto to accommodate different vacuum conditions of the pneumatic system employed at the site of the discharge of the material within the hoppers.

It is still another object to provide a hopper discharge arrangement of the foregoing type including a pneumatic discharge arrangement which is constructed and arranged to minimize the residue of discharge material in the sanitary pan after the hopper is discharged.

It is a further object taken in conjunction with the immediately foregoing objects wherein the means for increasing the feed area may be used to clean out the residual matter in the pan after the material has been discharged from the hoppers.

Figure 1:
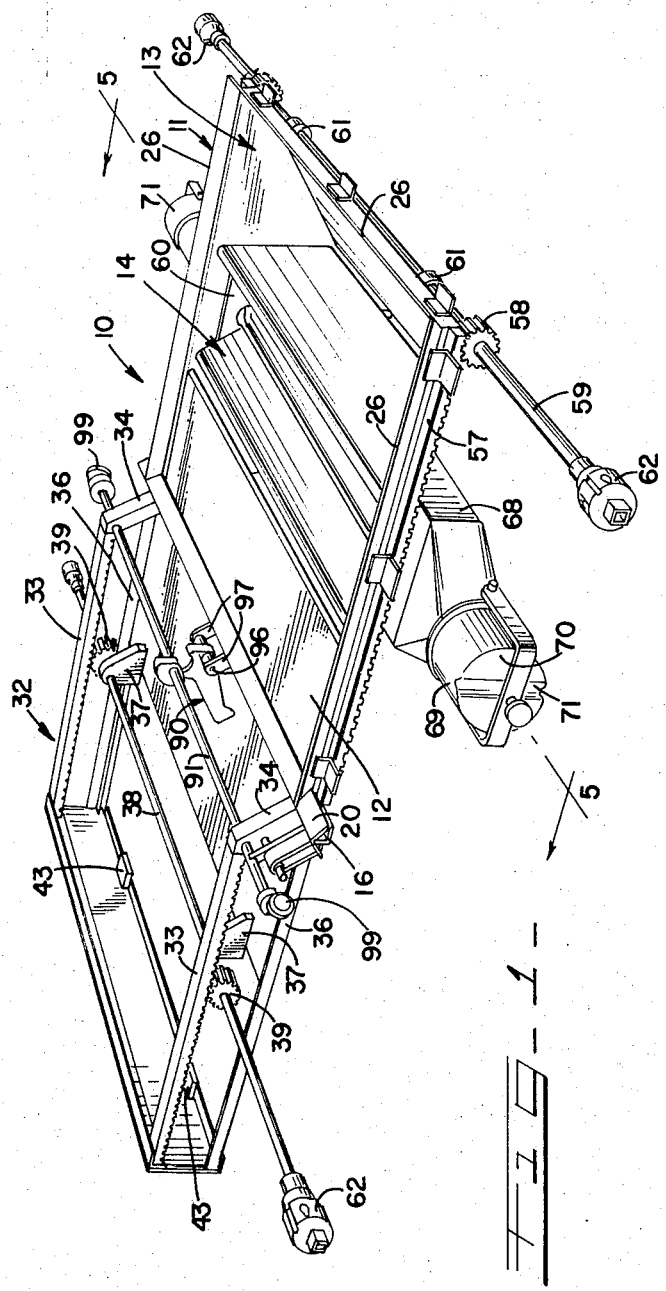
Figure 2:
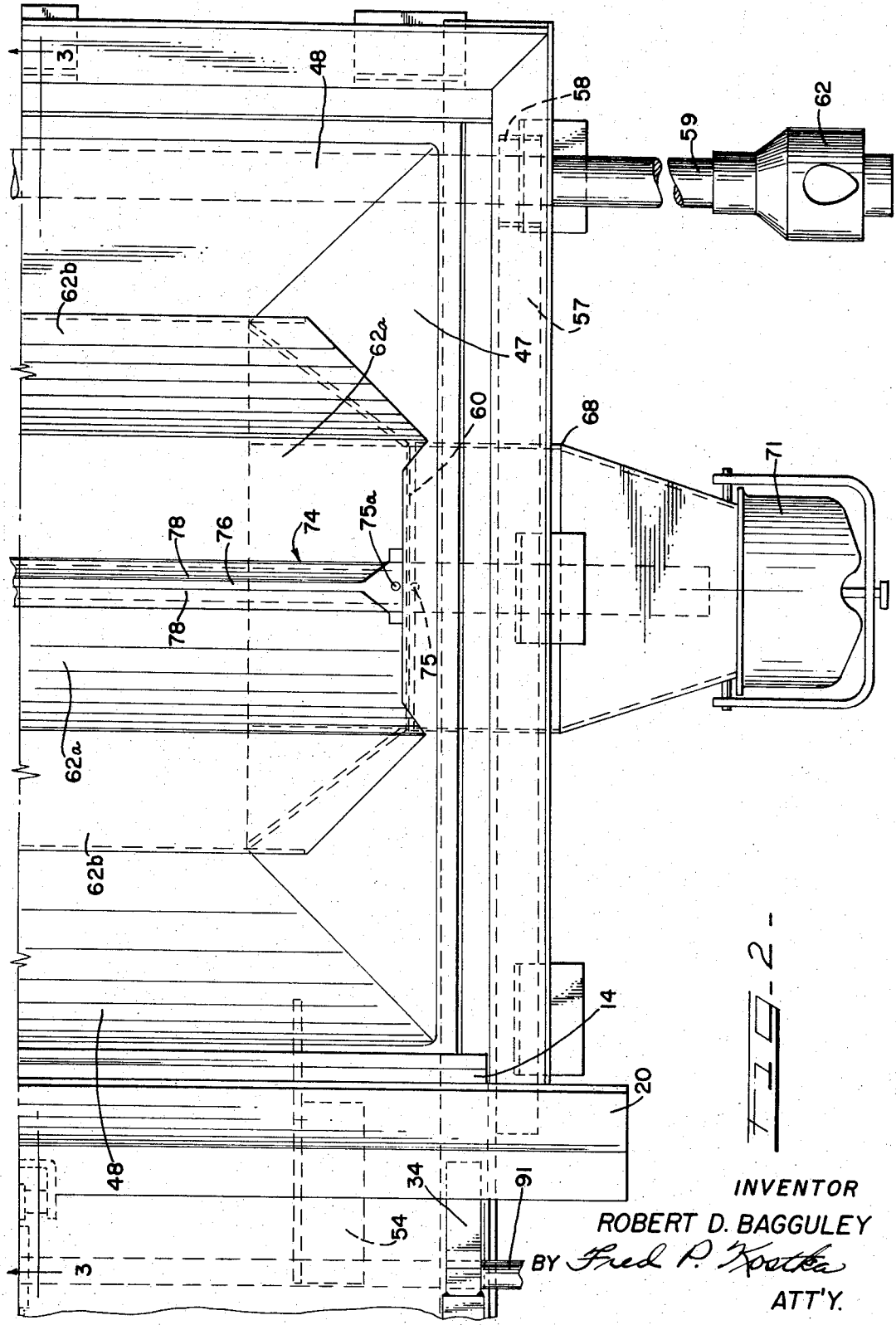

Further objects and features will hereinafter appear.
In the drawings:
FIG. 1 is a perspective view of the hopper discharge arrangement embodying the principles of the present invention;
FIG. 2 is a fragmentary top plan view of the hopper arrangement of the present invention showing in particular the pneumatic discharge structure mounted on the sanitary pan;
FIG. 3 is a fragmentary side elevational view taken generally along the lines 3—3 of FIG. 2;
FIG. 4 is a fragmentary side elevational view of the rack arrangement employed to move the sanitary gate to one side of the hopper discharge opening;
FIG. 5 is a fragmentary cross sectional view taken generally along the lines 5—5 of FIG. 1 and showing the auxiliary or inlet means provided in the pneumatic discharge structure and the valving means employed therein; and
FIG. 6 is a fragmentary perspective view of the sanitary pan showing in particular the arrangement of the pneumatic feed structure incorporated therein.

Referring now to the drawings, the material discharge arrangement 10 comprises generally a rectangular attachment frame 11 on which there is slidably mounted for lengthwise movement a gravity gate 12 and incorporating thereon a pneumatic feed discharge structure 14.

The rectangular frame 11 comprises along the left end thereof an angle 16 having a horizontal leg 17 and a vertical leg 18. Extending between the ends of the vertical leg 18 and the horizontal leg 17 and fixed thereto is one leg 19 of a second angle member 20 of which the other leg 21 is inclined outwardly and fixed to the vertical leg 18 of the angle 20 by means of a horizontally extending bracing plate 22. The remaining sides of the rectangular frame 11 are formed with a member 23 having a horizontal leg 24 and upwardly extending leg 25 from which there extends an outwardly inclined flange 26. As shown in FIG. 3 the frame 11 is adapted to be attached to the open discharge end 27 of a hopper 28. To this end the leg 19 of the angle 20 is affixed as by welding to one of the end slope sheets 29, while the outwardly inclined flanges 26 of the members 23 are fixed to the side slope sheets 31 and opposite slope sheet 29.

The frame 11, as shown in particular in FIGS. 1 and 4, further includes a gravity and sanitary pan support frame 32 for supporting the gravity gate 12 and sanitary pan 13 in a position displaced lengthwise of the hopper opening 28. The support frame 32 includes a pair of transversely spaced racks 33 which are fixed at their inner end to brackets 34 extending diagonally upward and affixed at one end to the flange 21 of the angle 20. Disposed below and inwardly of the rack members 33 are guide and support angles 36 which may be formed as an extension of the side members 23 of the attachment frame 11 to include the horizontal leg 24 and vertical leg 25. Extending transversely across the outer ends of the racks 33 and support angles 36 is a suitable bracing assembly 35.

The gravity gate 12 as shown is of substantially flat stock having an inclined lip which in the closed position of the gravity gate butts against the vertical flange 25 and is supported on a stop 44 affixed to the flange 23. At its other end there is affixed to the gate a pair of transversely spaced upstanding bracket plates 37—37 on which there is turnably mounted a transversely extending shaft 38. Affixed to the shaft 38 are gears 39 which mesh with the rack teeth on the underside of the rack members 33. At each of the ends there is affixed to the shaft 38 a wrench receiving member 62 so that upon the insertion of a wrench thereon to turn the shaft 38, the gravity gate is movable between an open position on the support frame 32 and a closed position overlying the hopper opening 27.

Slidably mounted for movement toward and away from the hopper opening 27 and below the gravity gate 12 is the sanitary pan 13 which is formed with a flat bottom 46 having upwardly inclined side and end walls 47 and 48, respectively. Integrally extending from the inclined sidewalls 47 and end walls 48 are horizontal flanges 49 and 51, respectively. The rear horizontal flange 51 in the closed position of the sanitary pan 13 butts against the stop 44 fixed to the horizontal leg 23 of the attachment flange 25. The forward or leading edge of the horizontal flange 51 has affixed thereto a wear plate 52 to which there is fastened the horizontal leg 53 of a pair of transversely spaced angle members 54 having a vertical leg 55 affixed to the outer end wall 48 as shown in FIGS. 2 and 3. The horizontal side flanges 49 of the pan are adapted to ride on the trackway defined by the horizontal ledge 41 extending outwardly of the block 42 on the horizontal legs 24 of the angle extensions 36.

For moving the sanitary pan 13 lengthwise of the hopper opening 28, there is fixed to the vertical flange 25 of the side frames 20 a pair of rack members 57. Meshing with the rack members 57 are gears 58 affixed to a shaft 59 turnably journaled in support brackets 61 fixed to the outerside of the rear inclined web 48 of the pan 13. Upon turning of the shaft 59 by way of a wrench attachable to dogs 62 fixed to each end of the shaft 59, the gears 58 meshing with the racks 57 are operative to slide the sanitary pan 13 lengthwise toward and away from the hopper opening 27. During such movement away from the opening 28 the side flanges 49 of the pan 13 ride on the trackway 41 of the supporting rack 32.

Mounted in the sanitary pan 13 is the pneumatic feed arrangement 14 which extends transversely between the side walls 47—47 and is operative to discharge the granular material from the hopper when the sanitary pan 13 is in the closed position and the gravity gate 12 is moved to the open position as shown for example in FIGS. 3 to 6, inclusive. The pneumatic discharge arrangement 14 includes a centrally disposed pair of V-shaped hood members 61 which extend transversely between the inclined side walls 47—47. The hoods each include outboard inclined legs 62b and inboard inclined legs 62a of which the terminal ends of each are spaced from the base 46 of the sanitary pan. Spanning and fixed across the ends of the inboard legs 62a—62a are vertical plates 60 which serve to hold the hoods 61 as a unit. Each of the plates 60 is formed with an opening 60a for receiving the ends of a valve member 72 which serves to removably retain the pneumatic discharge arrangement within the sanitary pan 13. Holding the outboard legs 62b spaced upwardly and providing intermediate support lengthwise are spaced columns 63 which may be fixed to the terminal ends of the former. The terminal edges of the inboard inclined walls 62a are spaced from each other to provide a central material inlet opening 64. At the outer edge an inlet opening 66 is formed between the base 46 and the end of the inclined legs 62b so that material being discharged from the hopper 28 may enter into the pneumatic feed arrangement by way of the side inlet 66 and center inlet 64 as more fully to be explained hereinafter.

It is to be noted that the side inlets 66 are located adjacent the change of slope of the base 46 with the inclined end walls 48 of the sanitary pan. This arrangement facilitates the cleaning of the pan so that little if any residue or build-up occurs during the pneumatic feeding of the material through the pneumatic feed arrangement 14.

Each of the end side walls 47—47 are formed with an opening 67 of substantially rectangular contour providing communication between the hoods 61—61 and transitional outlet conduits 68 fixed to the outer faces of the inclined side walls 47. At their outer ends the transitional outlet conduits 68 are each formed with cylinders 69 providing a material outlet 70 which during transit of the railway vehicle is closed by a detachable cap member 71.

Under some conditions it is not required to utilize all three of the material inlet openings 66—66 and 64 so that it may be desirable to close the central inlet opening 64. This is accomplished by way of a valving arrangement comprising a generally cylindrical tube or valve 72 which is turnably supported at each of its ends in the openings 60a of the plates 60 which extend vertical through the rectangular opening 60.

In this connection it is to be noted that the ends of the cylindrical tube 72 entering the side walls 47 tangentially contact the upper edge 67a of the rectangular opening 67. Thus the valve member 72 supported in the plates 60 and tangentially contacting the upper edge 67a of the rectangular opening 67 serves to retain the hoods 61—61 in the sanitary pan 13. Holding the valve member 72 against lengthwise movement, as shown for example in FIG. 5, is a fixed radial pin 75 and a removable radial pin 75a which are arranged to lie on opposite sides of the plate 60. Upon removal of the pin 75a, the valve 72 may be withdrawn so that the hoods 61 may be removed from the pan 13 for cleaning or painting of the latter.

The tube 72 is formed intermediate its ends with a downwardly extending radial section 76 which in the open position thereof, as shown in FIG. 3, provides radial walls 78—78 which are spaced from the terminal ends 79—79 of the downwardly inclined inboard sides 62a so that the granular material is free to flow through the openings 64a and 64b defined therebetween. To close off the opening 64, the valve 74 is rotated so that the circumferential portion 77 thereof lies over the opening 64. Turning of the valve member 74 is accomplished by manipulation of the ends thereof extending into the transitional portion of the outlet conduits 68.

During transit of the hopper vehicle the gravity gate 12 and the sanitary pan 13 are in the closed positions thereof underlying the hopper opening 27. It is to be noted that the sanitary pan 13 provides protection for the underside of the gravity gate and prevents the adherence of foreign matter thereon. Such foreign matter in the absence of the sanitary pan 13 is scrapped off during the opening of the gate and discharged into the storage bin with the material being discharged so as to contaminate the latter. Accordingly this condition is eliminated by the sanitary pan 13.

Holding the gravity gate 12 and sanitary pan 13 locked is a latching arrangement 90 including a shaft 91 turnably supported adjacent its ends in the brackets 34. Fixed for turning movement therewith is a locking sector 92 having a convex face 93 which in the locked position thereof engages or seats within a complementary concave surface 94 of a latch dog 95. The latch dog 95 is pivotally mounted on a shaft 96 carried by a pair of spaced support straps 97 fixed at the lower ends thereof to the leg 21 of the frame angle 20. At the lower end the latch dog 94 is formed with a depending leg 97 having a stop surface 98 abuttable against the ends of the guide angles fixed to the sanitary pan 13 and in the path of movement of the gravity gate 12 so as to preclude outward movement away from the hopper opening when the lock sector 92 and latch dog 95 are in the position shown in phantom in FIG. 4.

To release the latch dog 94 the wrench or the like is applied to one of the wrench receiving members 99 fixed to the ends of the shaft 91 and turned so that the lock sector 92 is turned to the full line position. This releases the latch dog 94 so that it is freely turnable and the gravity gate 12 and sanitary pan 13 are free to be moved away from the hopper opening 27 and onto the supporting frame 32 as heretofore described.

Gravity discharge, of course, is achieved by opening both the sanitary pan 13 and the gravity gate 12. In this connection it is to be noted that the pneumatic feed arrangement 14 mounted on the sanitary pan 13 is clear of the hopper opening 27 so as to provide an unobstructed flow of the granular material therethrough.

Pneumatic discharge is accomplished by maintaining the sanitary pan 13 underlying the hopper opening 27 with the gravity gate 12 in the open position as shown for example in FIG. 3. One of the conduits 69 is then connected to a source of vacuum of the discharge system at the unloading site and the other conduit may be opened to provide a source of air to facilitate the feed of the material through the hoods 61—61.

Material dropping through the hopper opening 27 drops into the sanitary pan 13 and onto the inclined legs 62b and 62a. During initial feeding of the material through the hoods the valve member 74 may be in the closed position overlying the center inlet 64 whereby the material enters through the slots 66 located adjacent the juncture of the base 46 and the inclined end walls 48. Should it be discovered that the material fed through the side slots 66 and into the airstream created by the vacuum under the hoods can be increased, the valve member 74 may be turned to the open position as heretofore explained to permit material to flow therethrough. Conditions which may require the opening of the center inlet 64 may be dependent on the amount of vacuum applied by the pneumatic discharge system or the characteristic of the granular material.

Should it not be required to use the center inlet opening 64, it is readily apparent that the granular material will build up on the top of the valve and the inboard inclined legs 62a—62a. To clear this residual build up after the material has been completely discharged from the hopper 28, the valve 74 it turned to its open position so that the vacuum acting under the hoods 61—61 is operative to draw the material through the inlet 64 and discharge the latter. Thus, the valve member serves as a clean-out aid to assure maximum discharge of the material into the storage bins.

What is claimed is:

1. A combination pneumatic and gravity outlet arrangement for attachment to the open end of a hopper, said pneumatic and gravity discharge arrangement comprising an attachment frame attachable to the open end of said hopper, a supporting frame fixed to said frame and extending lengthwise from said frame, a gravity gate supported on said frame and movable from a position underlying said opening to a position on said supporting frame clear of said opening, a sanitary pan supported on said frame below and underlying said gravity gate and movable lengthwise of said frame from said underlying position to a position on said support frame, pneumatic discharge means fixed in said sanitary pan and extending transversely thereof, said pneumatic discharge means including a pair of lengthwise spaced hood members each having an outboard inclined leg and an inboard inclined leg intersecting at an apex at one end and spaced from the base of the pan at the other ends thereof, said inboard leg of one of said hoods being spaced from the inboard leg of the other of said hoods to define a central material inlet, and conduit means connected to said pan and communicating with both of said hoods.

2. The invention as defined in claim 1 wherein said pan includes a base, and inclined side walls and end walls, and wherein the said terminal outboard legs of each of said hoods lie in a vertical plane in close proximity to the juncture of said end walls and said base.

3. The invention as defined in claim 2 wherein a rotary valve is disposed over said center inlet and having means in one turned position thereof permitting material to flow through said central inlet and means in another turned position precluding the feed of material through said central inlet.

4. The invention as defined in claim 3 wherein said support frame includes a rack, and gear means mounted on said gravity gate and meshes with said rack so that upon turning of said gear means said gravity gate may be selectively moved between a position underlying said hopper opening and a position on said support frame clear of said opening.

5. The invention as defined in claim 4 wherein a rack is fixed to the sides of said attachment frame and second gear means is mounted on said sanitary frame and meshing with said attachment frame mounted rack means so that upon turning of said second gear means said sanitary pan is selectively movable between a position underlying said hopper opening and a position on said support frame clear of said opening.

6. A sanitary pan for mounting on a hopper opening below a gravity gate said sanitary pan comprising a base, upwardly inclined sides and ends, pneumatic discharge means extending transversely between said sides, said pneumatic discharge means including a pair of lengthwise spaced hoods each having an inboard inclined leg and an outboard inclined leg, said terminal ends of said inboard and outboard legs being spaced from said base with said terminal inboard legs of said hoods also being spaced lengthwise of each other to provide a center inlet, and conduit means mounted on each of said side walls communicating with both of said hoods to provide outlets common to both of said hoods.

7. The invention as defined in claim 6 wherein a rotary valve is disposed over said center inlet, said rotary valve including means permitting material to enter through said center inlet in one turned position thereof and means closing off said center inlet in another turned position thereof.

8. The invention as defined in claim 7 wherein said terminal edges of said outboard inclined legs lie in a vertical plane close proximity to the juncture of said end walls with said base.

9. A combination pneumatic and gravity outlet arrangement for attachment to the open end of a hopper, said pneumatic and gravity discharge arrangement comprising a rectangular attachment frame, a supporting frame fixed to and extending lengthwise from one side of said rectangular frame, a plate slidable in said rectangular frame from a position underlying said opening to a position supported on said supporting frame clear of said opening, first rack means on said supporting frame and substantially co-extensive therewith, gear means on said plate meshing with said rack means for slidably moving said plate between said position on said rectangular frame and said support frame, a pan mounted on said rectangular frame below said plate means for sliding movement between a position underlying said opening and a position supported on said support frame, second rack means fixed to said rectangular frame and substantially co-extensive therewith, and gear means mounted on said pan meshing with said second racks for moving said pan between said position on said rectangular frame and said support frame.

10. The invention as defined in claim 9 wherein said first and second rack means are disposed in vertically spaced relationship.

References Cited

UNITED STATES PATENTS 2,950,143 8/1960 Koranda et al. _____ 302—52
3,220,778 11/1965 Aller _____ 302—52

ANDRES H. NIELSEN, *Primary Examiner.*